United States Patent [19]

Brassinga et al.

[11] Patent Number: 5,060,871
[45] Date of Patent: Oct. 29, 1991

[54] METHOD OF SEPARATING METAL ALLOY PARTICLES

[75] Inventors: Robin D. Brassinga, Kingston, Canada; Wijnand L. Dalmijn, Amsterdam, Netherlands

[73] Assignee: Alcan International Limited, Montreal, Canada

[21] Appl. No.: 496,051

[22] Filed: Mar. 16, 1990

Related U.S. Application Data

[63] Continuation of Ser. No. 243,320, Sep. 9, 1988, abandoned.

[30] Foreign Application Priority Data

Sep. 11, 1987 [CA] Canada .................................. 546685

[51] Int. Cl.⁵ .............................................. B02C 23/10
[52] U.S. Cl. ...................................... 241/24; 209/212; 209/222; 209/225; 241/23
[58] Field of Search ...................... 241/14, 23, 24, 25, 241/29, 79.1; 209/212, 214, 222, 225, 226, 227

[56] References Cited

U.S. PATENT DOCUMENTS

| | | | |
|---|---|---|---|
| 3,430,870 | 3/1969 | Weston | 241/79.1 X |
| 3,605,243 | 9/1971 | Oster | 241/29 X |
| 4,330,090 | 5/1982 | Montagna et al. | 241/14 |
| 4,491,473 | 1/1985 | Bowman et al. | 75/63 |

FOREIGN PATENT DOCUMENTS

| | | | |
|---|---|---|---|
| 0154207 | 9/1985 | European Pat. Off. | |
| 3416504 | 11/1985 | Fed. Rep. of Germany | |
| 1139506 | 2/1985 | U.S.S.R. | 209/212 |

OTHER PUBLICATIONS

B. C. Braam et al., "Recovery of Non-Ferrous Metals From Waste Using an Eddy Current Separator."

Primary Examiner—Joseph M. Gorski
Attorney, Agent, or Firm—Cooper & Dunham

[57] ABSTRACT

A method is described for separating a mixture of flat metal alloy particles in which the particles of one alloy are generally smaller and less conductive than the particles of another alloy, e.g. a scrap mixture of aluminum-lithium alloy and other wrought aluminum alloys. In this method, the scrap mixture is thermally pretreated and then crushed into relatively flat particles, such that the aluminum-lithium alloy is fragmented into smaller particle sizes than the otehr wrought alloys. These particles are then physically separated based on differences in particle size, density and/or electric conductivity. For instance, the separation may be done by an eddy current separator or a dense media separator.

8 Claims, 1 Drawing Sheet

METHOD OF SEPARATING METAL ALLOY PARTICLES

This is a continuation of application Ser. No. 243,320, filed Sept. 9, 1988 and now abandoned.

FIELD OF THE INVENTION

This invention relates generally to a method for separating metal alloy particles of different sizes and conductivities, and more particularly, to a method of separating an aluminum-lithium alloy from a scrap mixture of aluminum-lithium and other wrought aluminum alloys generated by machining operations.

There is a wide interest in being able to separate and recover different aluminum alloys. These alloy compositions may be broadly categorized as either wrought or cast, depending upon the alloying elements and their relative quantities. Techniques have been developed for separating wrought and cast aluminum from each other, and, for example, Montagna et al, U.S. Pat. No. 4,330,090 describes a method in which the mixture of wrought and cast aluminum is hot crushed so that the cast aluminum is fragmented while the wrought aluminum is flattened, after which the two types of aluminum are separated by screening.

Eddy current separators are commonly used to separate non-ferrous metals from non-metallics. They may also be used to separate metals with different conductivities, provided the conductivity differences are sufficiently large. Separators using eddy currents are described in Roos et al, German OS 2,059,655 published Jan. 9, 1971; Hopke, German OS 3,416,504 published Nov. 7, 1985 and Barth, European Application No. 83445, published Dec. 27, 1982.

There is a demand in the aerospace industry for aluminum-lithium alloys to replace currently used aluminum alloys. The use of the aluminum-lithium alloys can result in straight weight savings of 10% and a potential weight saving of 15-20% if designs take into consideration their lower densities and equivalent or better mechanical properties. In order for this to be commercially successful, it must be possible to economically reclaim the aluminum-lithium alloy from mixtures thereof with other aerospace aluminum alloys. However, both the aluminum-lithium alloy and the other aerospace aluminum alloys are wrought aluminum alloys and are more ductile than, for instance, cast aluminum alloys. This means that a separation method such as that described in U.S. Pat. No. 4,330,090 cannot be used because flattened particles would be obtained in both alloys which would not be amenable to screen separation.

It is the object of the present invention to find a simple method for physically separating flat aluminum alloy particles, e.g. separating aluminum-lithium alloy from a scrap mixture of aluminum-lithium alloy and other wrought aluminum alloys.

SUMMARY OF THE INVENTION

According to the present invention, it has been found that it is possible to physically separate a mixture of metal alloy particles in which the particles of one alloy are generally smaller, less conductive and lower density than the particles of another alloy. This is achieved by utilizing the difference in particle size, density and/or electric conductivity to physically separate the particles.

According to one embodiment, a mixture of flat particles is moved along a separator table and through a rapidly changing magnetic field separation zone such that the larger and more conductive particles are deviated from their normal trajectory along the table, thereby forming one flow path of flat particles containing the larger and more conductive particles and a second flow path containing the smaller and less conductive particles.

The mixture of flat particles is moved along the separator table by vibrating the table to cause the particles to move in a longitudinal flow path along the table. The rapidly changing magnetic field moves across the separator table in a direction generally parallel to the table surface and generally perpendicular to the particle flow path along the table. It is also preferable to provide the table with a slight lateral tilt upwards in the direction of travel of the magnetic field. This combination of vibrating table, rapidly changing magnetic field and slight lateral tilt of the vibrating table makes possible the separation of flat particles of different sizes and conductivities. It is believed that the rapidly changing magnetic field preferentially moves the larger and more conductive particles laterally up the lateral slope in a series of steps during short periods of time when the particles are out of contact with the table because of the vibrations. In this way, two longitudinal flow paths are formed along the table and the particles are effectively "magnetically screened".

According to another embodiment, the separation is carried out in a dense media cyclone separator which exploits the differences in particle size and density. In the cyclone separator, introduced metal particles with a higher density than the apparent density of the medium tend to migrate to the periphery. The fact that the more dense particles also tend to be the larger particles, enhances this migration. The introduced metal particles with a lower density than the apparent density of the medium tend to migrate to the centre. The fact that these metal particles tend to be smaller than the average means that they are only slightly affected by centrifugal forces and the density difference has the greatest effect on the migration to the centre.

The flat metal alloy particles of different sizes are preferably obtained by breaking down a scrap mixture. For example, it has been found that it is possible to crush a scrap mixture of aluminum-lithium alloy and other wrought aluminum alloys such that flat particles of different sizes are obtained because of differences in the degree of ductility of the different alloys. Thus, the aluminum-lithium alloy is somewhat less ductile than the other wrought aluminum alloys and, consequently, when the scrap mixture is broken down, all particles produced are generally uniformly flat with the aluminum-lithium alloy particles being generally smaller than the other wrought aluminum alloy particles.

In order to obtain the desired particle size difference, it is particularly advantageous to subject the scrap mixture to a heat treatment prior to breaking down to enhance the difference in ductility between the different alloys. During heat treatment, the scrap mixture is heated to temperatures usually above 190° C. and up to 300° C. and preferably at about 210°-225° for at least 15-30 minutes. This heat treatment serves to reduce the fracture toughness of the aluminum-lithium alloy component to a minimum while not adversely influencing this property of the other wrought alloys, and it may also serve to de-oil the scrap mixture. The scrap mixture is preferably broken down by shredding and/or crushing in a roller-crusher and during this operation, the enhanced difference in fracture toughness or ductility is used to advantage to produce generally uniformly flat particles with aluminum-lithium particles being formed which are generally smaller than the other wrought aluminum alloy particles. The particles are preferably crushed such that the width of each particle is at least twice the thickness, with widths in the range of 2 to 25 mm being preferred.

The rapidly changing magnetic field is preferably formed by an eddy current separator having permanent magnets moving in a plane substantially parallel to the separator table surface and in a direction substantially perpendicular to the particle flow path on the table. For effective separation, a major proportion of the larger particles have a greatest flat dimension longer than the magnetic wavelength and a major proportion of the smaller particles have a greatest flat dimension shorter than the magnetic wavelength.

Eddy-currents are currents that are induced in electrically conducting particles that are exposed to a changing magnetic field. Due to the interaction between the magnetic field and eddy currents, a force is exerted on such a conducting particle. This force causes conducting particles to be deflected and it has been found that the repulsive force set up by eddy currents is a function of particle size, particle geometry, the ratio conductivity/density ($\sigma/\rho$) and the magnetic field strength.

Based on the electric conductivities and densities of various aerospace aluminum alloys, the following conductivity/density ($\sigma/\rho$) values were obtained:

| Alloy | $\sigma/\rho \times 10^3$ m$^2$/ohm.kg |
| --- | --- |
| Al—Li—Cu—Mg, Fe within specs, naturally aged | 3.7 |
| Al—Li—Cu—Mg, High Fe, Overaged 16 h at 190° C. | 4.6 |
| 2024 Al—Cu—Mg—Mn T351 | 6.5 |
| 2219 Al—Cu—Mn T851 | 7.6 |
| 7075 Al—Zr—Mg—Cu T651 | 7.6 |
| 7010 Al—Zn—Mg—Cu T73651 | 8.4 |
| 7075 Al—Zn—Mg—Cu T7351 | 8.6 |

Thus, the aluminum-lithium alloy particles are smaller and have lower $\sigma/\rho$ values than the particles of the other wrought aluminum alloys in the aerospace scrap mixture.

The eddy current separator can be one that employs permanent magnets mounted on a rotating mild steel disc or on moving belt. The permanent magnets mounted on a moving belt may be used in conjunction with a large number of vibrating flow paths arranged side by side. Eddy current systems are reported by Braam, Dalmijn and Duyvestyn in Proc. of Int. Symp. on Recycle and Secondary Recovery of Metals, Ft. Lauderdale, Fla., 1985, pages 641-654.

For the greatest separation efficiency, the vibrating separator table preferably has a lateral tilt in the range of 1-10°, with a tilt of about 3°-7° being particularly preferred. To obtain an alternating magnetic field of adequate strength, magnets are preferably made of Sm-Co or Nd-Fe-B and by rapidly moving them with respect to the scrap and thereby changing the magnetic field, strong eddy currents and forces are created in the conducting scrap.

The vibrating separator table may also have a tilt in the direction of the particle flow paths and the amount of this tilt determines the retention time of the particles on the table. Thus, depending upon the retention time desired, the table may tilt upwardly or downwardly in the direction of travel of the vibrating particles or it may be level in the longitudinal direction, provided it has a slight lateral tilt upwards in the direction of travel of the magnetic field.

Dense media separation is a widely used technique and the equipment available, including a cyclone separator, is described in Perry, Chemical Engineers' Handbook, 6th Edition, 1984, McGraw-Hill Book Company. In cyclone separators, the medium and the feed enter the separator together tangentially and the separation takes place in the cone-shaped part of the cyclone by the action of centrifugal and centripetal forces. Among suitable dense media for carrying out the process of this invention, there may be mentioned glass beads and water.

The invention is further illustrated by the attached drawings in which.

Figure 1:
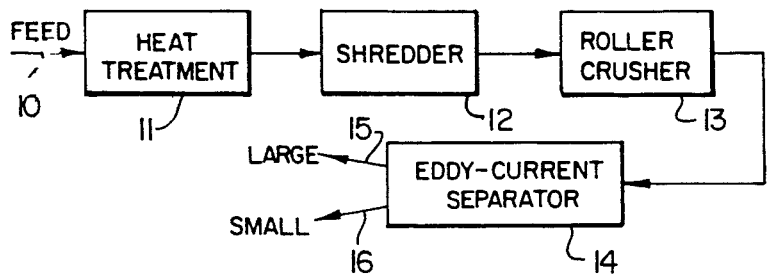
FIG. 1 is a schematic flow sheet of the process of the invention.

The general flow sheet of the process is shown in FIG. 1 and a feed of a scrap mixture or swarf 10 is fed to a heat treatment 11. The heat treatment is carried out at a temperature of preferably above 200° C. for at least 15 minutes. The heat treatment serves to remove any oils and contaminants from the surface of the scrap mixture and, at the same time, it reduces the fracture toughness of the aluminum-lithium alloy component while not adversely influencing this property of the other wrought alloys.

The heat treated scrap is then passed through a shredder to break it down into relatively small particle sizes and then fed to a roller crusher 13 where the particles may be further broken down in size and flattened to form generally uniformly flat particles.

These uniformly flat particles are then transferred by vibrating feeders in such a manner that the particles form a single layer of discrete particles moving along the vibrating feeders. In this manner they are transferred to an eddy-current separator 14 within which the mixture is separated into small flat particles 16 comprising the aluminum-lithium alloy and large flat particles 15 comprising the other wrought aluminum alloy.

Figure 2:
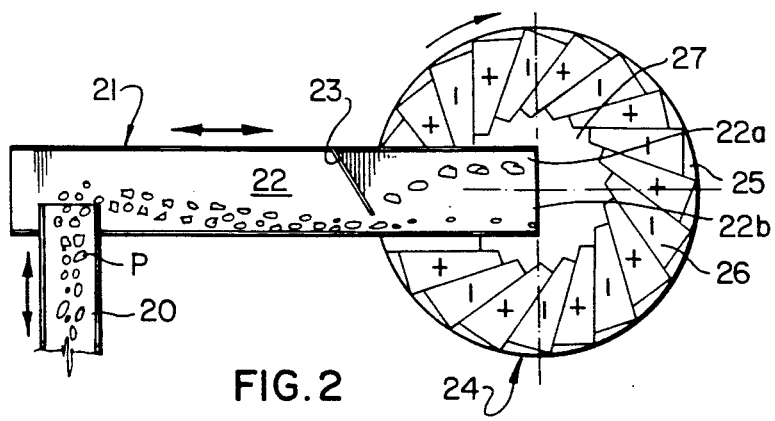
FIG. 2 is a top plan view of an eddy current separator according to the invention.
Figure 3:
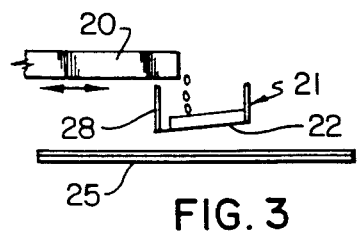
FIG. 3 is a side elevation of the separator shown in FIG. 2.

The eddy-current separator is shown in greater detail in FIGS. 2 and 3. A vibrating feeder 20 feeds flat mixed particles P onto a vibrating separator table 21 having a flat bottom surface 22 and side walls 28. The flat particles P move along the surface 22 of vibrating feeder 21 in a single layer as separate discrete particles and they are funneled into a substantially single file movement by means of deflector gate 23. As the particles move past gate 23 they come under the influence of the eddy-currents generated by the rotating permanent magnet 24 which consists of a mild steel plate 25 with samarium-cobalt magnets 26 mounted thereon.

The rotating permanent magnet 24 exerts a force on the vibrating larger and more conductive particles such that they move across the surface 22 to the side 22a thereof. The smaller and less conductive particles are less influenced by the eddy-currents and, therefore, continue along a substantially straight line path on the side 22b of surface 22. It has been found to be especially advantageous in terms of obtaining a clear separation between the particles if the bottom surface 22 is sloped laterally upwardly towards side 22a at a slope of about 4°-5°. If desired, the vibrating feeder 22 may also have a slight upward slope in the longitudinal direction between feeder table 20 and rotating permanent magnet 24.

The separated particles drop down through the centre cavity 27 of permanent magnet 24 and into hoppers (not shown) for collection.

We claim:

1. A method of separating a mixture of aluminum-lithium alloy and other wrought aluminum alloys comprising the steps of:
    (a) crushing the mixture into the form of substantially flat particles in which the particles of aluminum-lithium alloy have generally smaller dimensions, smaller density values and smaller conductivity values than the particles of the other wrought aluminum alloys, and
    (b) physically separating the mixture thus obtained by moving said mixture of flat particles in a generally longitudinal flow path along a vibrating separator table, thereby causing said particles to enter in substantially single file a rapidly changing magnetic field separation zone in which the magnetic field moves across the separator table in a direction generally perpendicular to the particle flow path, and providing the table with a slight lateral slope upwards in the direction of travel of the magnetic field, whereby the rapidly changing magnetic field moves the larger and more conductive particles laterally up the lateral slope, thereby forming on the table one flow path comprising the larger and more conductive particles laterally up the lateral slope, thereby forming on the table one flow path comprising the larger and more conductive particles containing said other wrought aluminum alloys and another path comprising the smaller and less conductive particles containing said aluminum-lithium alloy.

2. The method according to claim 1 which comprises heat treating the mixture of metal alloys, thereby reducing fracture toughness of the aluminum-lithium alloy prior to crushing the mixture.

3. The method according to claim 2 wherein the crushing step comprises flattening the particles by passing them through a roller-crusher.

4. The method according to claim 3 which comprises shredding the heat treated alloy mixture prior to passing through the roller-crusher.

5. The method according to claim 2 which comprises moving the metal alloy flat particles along the separator table in a single layer.

6. The method according to claim 1 which comprises forming the rapidly changing magnetic field by permanent magnets moving in a path parallel to the separator table and perpendicular to the flow path of the particles along the table.

7. The method according to claim 6 wherein the slope is from 1°-10°.

8. A method of separating a mixture of aluminum-lithium alloy and other wrought aluminum alloys, said aluminum-lithium alloy having smaller density values and smaller conductivity values that the other wrought aluminum alloys, comprising the steps of:
    (a) crushing the mixture into the form of substantially flat particles in which the particles of aluminum-lithium alloy have generally smaller dimensions than the particles of the other wrought aluminum alloys, and
    (b) physically separating the mixture thus obtained by moving said mixture of flat particles in a generally longitudinal flow path along a vibrating separator table, causing said particles to enter as separate discrete particles a rapidly changing magnetic field separation zone in which the magnetic field moves across the separator table in a direction generally perpendicular to the particle flow path, and providing the table with a slight lateral slope upwards in the direction of travel of the magnetic field, whereby the rapidly changing magnetic field moves the larger and more conductive particles laterally up the lateral slope, thereby forming on the table one flow path comprising the larger and more conductive particles containing said other wrought aluminum alloys and another path comprising the smaller and less conductive particles containing said aluminum-lithium alloy.

* * * * *